(12) United States Patent
Diks-Warmerdam et al.

(10) Patent No.: US 12,396,553 B2
(45) Date of Patent: Aug. 26, 2025

(54) CONTAINER FOR STORING AND SERVING FROZEN CONFECTIONERY ITEMS

(71) Applicant: Conopco, Inc., Englewood Cliffs, NJ (US)

(72) Inventors: Leonie Martine Diks-Warmerdam, Maassluis (NL); Johannes Krieg, Rotterdam (NL); René Joachim Buter, Vlaardingen (NL)

(73) Assignee: Conopco, Inc.

( * ) Notice: Subject to any disclaimer, the term of this patent is extended or adjusted under 35 U.S.C. 154(b) by 690 days.

(21) Appl. No.: 17/610,784

(22) PCT Filed: May 11, 2020

(86) PCT No.: PCT/EP2020/063082
§ 371 (c)(1),
(2) Date: Nov. 12, 2021

(87) PCT Pub. No.: WO2020/229426
PCT Pub. Date: Nov. 19, 2020

(65) Prior Publication Data
US 2022/0248840 A1    Aug. 11, 2022

(30) Foreign Application Priority Data

May 14, 2019   (EP) ..................................... 19174506

(51) Int. Cl.
*A47B 31/02*    (2006.01)
*B64D 11/00*    (2006.01)
(Continued)

(52) U.S. Cl.
CPC .......... *A47B 31/02* (2013.01); *B64D 11/0007* (2013.01); *F25D 3/06* (2013.01);
(Continued)

(58) Field of Classification Search
CPC . F25D 11/006; F25D 3/06; F25D 3/12; F25D 2303/0821; F25D 2303/0843;
(Continued)

(56) References Cited

U.S. PATENT DOCUMENTS 2,165,327 A * 7/1939 Zalkind ................... B65D 5/58
                                                     229/199
4,296,426 A   10/1981 Gilles
(Continued)

FOREIGN PATENT DOCUMENTS

AU    2014382728    8/2016
CN    102213529    10/2011
(Continued)

OTHER PUBLICATIONS

Search Report and Written Opinion in EP19174511; Oct. 25, 2019.
(Continued)

*Primary Examiner* — Filip Zec

(57) ABSTRACT

A thermally insulated container for storing and serving frozen confectionery items, wherein the container is preferably arranged to be removably mounted within a service cart, such as an inflight service cart.

20 Claims, 5 Drawing Sheets

(51) Int. Cl.
*F25D 3/06* (2006.01)
*A47B 31/00* (2006.01)

(52) U.S. Cl.
CPC ... *A47B 2031/002* (2013.01); *A47B 2031/026* (2013.01); *F25D 2303/0821* (2013.01); *F25D 2303/0843* (2013.01); *F25D 2303/0844* (2013.01); *F25D 2303/0845* (2013.01); *F25D 2400/20* (2013.01)

(58) Field of Classification Search
CPC ..... F25D 2303/0844; F25D 2303/0845; F25D 2400/20
See application file for complete search history.

(56) References Cited

U.S. PATENT DOCUMENTS

| | | | |
|---|---|---|---|
| 4,528,439 A | 7/1985 | Marney | |
| 4,898,294 A | 2/1990 | Jennings | |
| 8,763,811 B2* | 7/2014 | Lantz | B65D 65/466 206/584 |
| 9,303,912 B1 | 4/2016 | Schalla et al. | |
| 9,731,895 B2* | 8/2017 | Manning | B65G 1/045 |
| 10,046,901 B1* | 8/2018 | Jobe | B65D 65/46 |
| 10,168,090 B1 | 1/2019 | Chapman, Jr. | |
| 10,266,332 B2* | 4/2019 | Aksan | B65D 81/3862 |
| 11,046,500 B2* | 6/2021 | Collison | B65D 81/3858 |
| 11,078,008 B2* | 8/2021 | Dankbaar | B65D 5/56 |
| 11,199,354 B2* | 12/2021 | Geitz | F25D 25/02 |
| 11,828,516 B2* | 11/2023 | Sun | A01N 1/0257 |
| 2003/0111472 A1 | 6/2003 | Lerner | |
| 2003/0131623 A1 | 7/2003 | Suppes | |
| 2006/0006621 A1 | 1/2006 | Santa Cruz et al. | |
| 2009/0078708 A1 | 3/2009 | Williams | |
| 2010/0170287 A1 | 7/2010 | Boss | |
| 2011/0277489 A1 | 11/2011 | Schalla et al. | |
| 2014/0021208 A1 | 1/2014 | Anti | |
| 2014/0054297 A1 | 2/2014 | Patstone | |
| 2014/0263835 A1 | 9/2014 | Godecker et al. | |
| 2014/0331946 A1 | 11/2014 | Eilemann et al. | |
| 2015/0143818 A1 | 5/2015 | Eckhoff | |
| 2015/0191192 A1 | 7/2015 | Savage et al. | |
| 2016/0320080 A1* | 11/2016 | Hieke | F24F 5/0017 |
| 2017/0023290 A1 | 8/2017 | Demuth | |
| 2017/0297717 A1 | 10/2017 | Moran et al. | |
| 2018/0282049 A1 | 10/2018 | Tumber | |
| 2018/0339838 A1* | 11/2018 | Hall | B65B 55/20 |
| 2018/0346122 A1 | 12/2018 | Kzrak | |
| 2019/0162639 A1* | 5/2019 | Gutelius | G01N 1/2813 |
| 2020/0161616 A1 | 5/2020 | Chen | |
| 2020/0290790 A1* | 9/2020 | Mowery | F25D 3/08 |
| 2021/0300665 A1* | 9/2021 | Melchor | B65D 81/3827 |
| 2022/0087254 A1* | 3/2022 | Bixon | A01N 1/0257 |

FOREIGN PATENT DOCUMENTS

| | | |
|---|---|---|
| CN | 102379532 | 11/2011 |
| CN | 102607235 | 7/2012 |
| CN | 103988045 | 8/2014 |
| CN | 203958959 | 11/2014 |
| CN | 204937738 | 1/2016 |
| CN | 205947109 | 2/2017 |
| CN | 206761922 | 12/2017 |
| CN | 108602562 | 9/2018 |
| CN | 209209482 | 8/2019 |
| CN | 209312826 | 8/2019 |
| DE | 29611084 | 11/1996 |
| EP | 2700891 | 2/2014 |
| GB | 2543837 | 5/2017 |
| JP | 2012102744 | 5/2012 |
| JP | 2012131539 | 7/2012 |
| JP | 2013085550 | 5/2013 |
| JP | 2016084149 | 5/2016 |
| KR | 100836844 | 6/2008 |
| KR | 101457029 | 10/2014 |
| WO | WO03083386 | 10/2003 |
| WO | WO08104639 | 9/2008 |
| WO | WO2008107657 | 9/2008 |
| WO | WO12056086 | 5/2012 |
| WO | WO2015120911 | 8/2015 |
| WO | WO2017072508 | 5/2017 |
| WO | WO2019161426 | 8/2019 |

OTHER PUBLICATIONS

Search Report and Written Opinoin in EP19174506; Oct. 25, 2019.
Search Report and Written Opinion in EP19213453; May 25, 2020.
Search Report and Written Opinion in EP19213454; Jun. 4, 2020.
Search Report and Written Opinion in PCTEP2020062473; Jul. 23, 2020.
Search Report and Written Opinion in PCTEP2020063082; Jul. 23, 2020.
Search Report and Written Opinion in PCTEP2020081401; Feb. 3, 2021.
Search Report and Written Opinion in PCTEP2020081400; Feb. 3, 2021.
U.S. Appl. No. 17/610,790, filed Nov. 12, 2021, entitled Container for Storing and Serving Frozen Confectionery Items.
U.S. Appl. No. 17/781,361, filed May 31, 2022, entitled Container for Storing and Serving Frozen Confectionery Items.
U.S. Appl. No. 17/781,362, filed May 31, 2022, entitled Container for Storing and Serving Scoopable Frozen Confectionery.

* cited by examiner

CONTAINER FOR STORING AND SERVING FROZEN CONFECTIONERY ITEMS

FIELD OF THE INVENTION

The present invention relates to a thermally insulated container for storing and serving frozen confectionery items, and particularly to such containers which are designed to be removably mountable within a service cart.

BACKGROUND OF THE INVENTION

Inflight service carts (i.e. wheeled trolleys) are commonly used for storing and dispensing food and beverages on modern commercial aircraft. Such carts facilitate at-seat service of these products during the flight. Similar service carts are used on other modes of transport (e.g. on trains). Keeping the foodstuffs at an appropriate temperature within such carts is a recognised problem.

There is prior art relating to refrigerated storage of foodstuffs within inflight service carts, which largely focuses on maintaining the temperature of the foodstuffs within the chilled range (e.g. +2° C. to +8° C.). Dry ice is typically used as the refrigerant. For example, WO 2012/056086 A1 relates to a refrigerator unit for an inflight service cart which utilises dry ice in such a way that it releases chilled air evenly, and without freezing the products.

The storage of frozen products, such as ice cream and similar frozen confections, has also been addressed by the prior art. U.S. Pat. No. 4,898,294 describes a frozen food container for aircraft usage. The container comprises bottom, end, side and top walls formed of a thermally insulating material contained between an inner and outer shell, the top wall having an insulated lid formed in the forward portion thereof. Preferably the container is provided with one or more receptacles adapted to receive dry ice, with the top wall of the container comprising these dry ice storage chambers.

Using dry ice in containers for storing and serving frozen confectionery items is not ideal. Firstly, such frozen confectionery items are too hard to be consumed directly if kept at −78° C. Secondly, since the dry ice sublimes, it will inevitably need replacing after a single use.

Therefore, there remains a need to provide insulated containers which improve the length of time that the frozen confectionery items can be kept at a suitable temperature in order to ensure that they can be consumed directly on serving. It is preferred that such insulated containers are reusable.

Furthermore, there is a need to achieve this when the frozen confectionery items are stored and served in an environment remote from a storage freezer and/or wherein the container needs to be transportable thus enabling an at-seat service of the frozen confectionery items to passengers (e.g. during a flight or a train journey).

SUMMARY OF THE INVENTION

In a first aspect, the invention relates to a thermally insulated container for storing and serving frozen confectionery items, the container comprising:
    a thermally insulated outer housing defining an insulated chamber, the thermally insulated outer housing having at least one openable side to allow access to the chamber,
    a thermally conductive inner frame mounted within the insulated chamber, the inner frame having at least an upper wall and a lower wall which are connected by two side walls, thereby delineating a four-sided thermally conductive perimeter within the outer housing,
    at least a first reservoir of phase change material, positioned in thermal contact with the inner frame,
and wherein the inner frame is mounted within the insulated chamber such that that there is a gap between the thermally insulated outer housing and the thermally conductive inner frame, the gap having a width of 2 to 8 mm.

In a second aspect, the present invention relates to a method for storing and serving frozen confectionery items using the thermally insulated container of the first aspect, the method comprising:
    cooling the reservoir(s) of phase change material to a temperature of less than −6° C.;
    mounting the thermally conductive inner frame within the insulated chamber of the thermally insulated outer housing such that the cooled reservoir(s) of phase change material are in thermal contact with the inner frame and a plurality of frozen confectionery items are loaded within the inner frame; wherein the inner frame is mounted within the insulated chamber such that that there is a gap between the thermally insulated outer housing and the thermally conductive inner frame, the gap having a width of 2 to 8 mm;
    storing the frozen confectionery items within the insulated chamber for a period of up to 24 hours and serving the frozen confectionery items during the storage period by opening an openable side of the thermally insulated outer housing and removing at least one of the frozen confectionery items from the insulated chamber, and then preferably closing the openable side of the thermally insulated outer housing.

In a third aspect, the invention relates to a service cart, preferably an inflight service cart, comprising at least one thermally insulated container according to the first aspect of the invention.

DETAILED DESCRIPTION OF THE INVENTION

The present invention relates to a thermally insulated container for storing and serving frozen confectionery items. There is no particular limitation with regard to the type of frozen confectionery items which can be stored and served using the insulated container. Non-limiting examples of frozen confectionery items include ice cream, gelato, frozen yoghurt, sorbet, granita, water ice, and the like.

The thermally insulated storage container of the present invention comprises a thermally insulated outer housing defining an insulated chamber. The thermally insulated outer housing is preferably cuboid, with 6 thermally insulated sidewalls delimiting the insulated chamber. The thermally insulated outer housing has at least one openable side to allow access to the chamber. The thermally insulated chamber is sealed when the openable side is in a closed position and accessible when the openable side is in an open position. It will be apparent that it is not necessary for the entire side to open—merely that a portion of the side is openable so as to allow access to the chamber. Advantageously the openable side is a door component which is hingedly attached to one of the other sides. Additionally or alternatively, at least one of the walls can be a removably engageable lid component. The thermally insulated outer housing can be made from any suitable material having thermal insulation properties. Preferably, but not exclusively, the thermally insulated outer housing comprises a material selected from:

expanded polypropylene (EPP), polyurethane (PU), Aerogel, and vacuum panels. Suitable thermally insulated outer housings are described in WO 2008/104639 A1, which is hereby incorporated in its entirety.

The thermal insulated storage container also comprises a thermally conductive inner frame mounted within the outer housing. Preferably, the inner frame is removably mounted within the outer housing, since this allows it to be cleaned separately from the outer housing. However, it is also possible for the inner frame to be permanently mounted within the outer housing.

The inner frame is mounted within the insulated chamber such that there is a gap between the thermally insulated outer housing and the thermally conductive inner frame, the gap having a width of 2 to 8 mm. In order to ensure that the gap is maintained even when the insulated container is subjected to significant vibrations (e.g. such as may be the case if turbulence is encountered), the gap has a width of at least 2 mm, preferably at least 2.5 mm, and most preferably at least 3 mm. In order to maximise the space available for storing frozen confections within the insulated container, the gap has a width of no more than 8 mm, preferably no more than 6 mm, and most preferably no more than 5 mm.

The inner frame has at least and upper wall and a lower wall which are connected by two side walls, thereby delineating a four-sided thermally conductive perimeter within the outer housing. Although for convenience the walls are described with reference to their position in a preferred arrangement, the skilled person will appreciate that the thermally insulated container of the present invention is designed to be transportable and may be rotated during use. Therefore, the designation "upper wall", "lower wall" and "sidewall" should not be read as limiting the orientation of the frame per se.

It is possible (but not necessary) that the thermally conductive inner frame additionally comprises a thermally conductive back plate. Where such a back plate is present the inner frame delimits a five-sided conductive boundary within the outer housing. The thermally conductive inner frame could additionally comprise a thermally conductive front plate. Where both a back plate and a front plate are present, the inner frame delimits a six-sided conductive boundary within the outer housing. Where such an arrangement is present, at least one side of the conductive frame is openable—preferably the front plate and/or the back plate, and most conveniently the front plate.

It will be appreciated, that whilst an arrangement wherein the inner frame delimits a six-sided conductive boundary is optimal from the point of view of maximising conductivity (and hence ensuring that the cooling effect achieved by the reservoir(s) of phase change material is disseminated throughout the chamber), this needs to be balanced with the practicality of accessing the frozen confectionery items within the chamber in a convenient manner. In addition, even when the conductive inner frame is constructed from a lightweight material (such as aluminium or an aluminium alloy), each additional side will inevitably increase the weight of the container and, since the air gap between the thermally conductive inner frame and the thermally insulated outer housing must be present, decrease the storage space available for the frozen confectionery items.

In order to maximise the volume available for accommodating the frozen confectionery items, it is preferred that the thickness of the thermally conductive inner frame is not too great. Therefore, the thermally conductive inner frame preferably has a thickness of no more than 5 mm, more preferably no more than 4 mm, or even no more than 3 mm. In order to preserve the gap, a relatively rigid frame is preferred (especially in arrangements with a small gap). Therefore, the thermally conductive inner frame preferably has a thickness of at least 0.5 mm, more preferably at least 0.8 mm, still more preferably at least 1 mm or even at least 1.5 mm.

Whilst it is envisaged that the upper wall, lower wall and side walls can be continuous sheets of conductive material, this is not necessary. Indeed, one or more of these walls could have a partially discontinuous structure (e.g. a mesh-like or lattice-like structure). For example, one or more of the walls could comprise a perforated metal sheet or a wire mesh. The same is true of the front and/or back plate (where present). Such a partially discontinuous structure may be advantageous as it has the potential to reduce the overall weight of the inner frame whilst still maintaining the thermally conductive perimeter/boundary. Where one or more wall has a partially discontinuous structure, it is preferred that there is an additional barrier layer to help maintain the gap between the frame and the outer housing. For example, such a barrier layer could be provided by a reservoir of phase change material, product drawer and/or any secondary packaging.

The thermally insulated storage container comprises at least a first reservoir of phase change material (such as eutectic material) positioned in thermal contact with the inner frame. The at least first reservoir of phase change material is preferably positioned so as to contact the upper wall of the inner frame, and is most preferably positioned between the inner frame and the outer housing. Nevertheless, it is also possible for the at least first reservoir of phase change material to be positioned so as to contact the inner frame and/or a sidewall of the inner frame.

The thermally insulated container preferably comprises a second reservoir of phase change material positioned in thermal contact with the inner frame. In a preferred arrangement, the first reservoir of phase change material is positioned so as to contact the upper wall of the inner frame and the second reservoir of phase change material is positioned so as to contact the lower wall of the inner frame. In such an arrangement, the first reservoir is preferably positioned between the inner frame and the outer housing, and the second reservoir of phase change material is positioned within the inner frame.

As the phase change material changes from solid to liquid phase, the effect of gravity will mean that the liquid phase contacts the lower surface of the reservoir. Without wishing to be bound by theory, the inventors believe that the thermal contact between the reservoir(s) of phase change material and the thermally conductive inner frame is more efficient if the reservoir is arranged on top of the appropriate surface of the inner frame. Thus, where the reservoir is positioned so as to contact the upper wall of the inner frame, then the reservoir is preferably positioned outside the inner frame (i.e. on top of and in contact with the upper external surface of the inner frame). Conversely, where the reservoir is positioned so as to contact the lower wall of the inner frame, then the reservoir is preferably positioned inside the inner frame (i.e. on top of and in contact with the lower internal surface of the inner frame). Where a reservoir of phase change material is positioned so as to contact a side wall of the inner frame, there is no preference between it being positioned inside or outside the frame in respect of gravity effects. Rather, the choice of position will be determined based on where sufficient space is most readily available to accommodate the reservoir of phase change material.

The precise construction of the reservoir of phase change material is not especially important. For example, the phase change material could be contained within a flexible outer membrane or within a rigid shell.

A rigid shell filled with phase change material is sometimes preferred, as such a shell can have one or more feature(s) which interact with one or more feature(s) of the thermally insulated outer housing (e.g. protruding side ribs which interact with moulded grooves in the internal surface of the outer housing). This arrangement allows the thermally conductive housing to be mounted within the insulated chamber, e.g. by attaching the thermally conductive inner frame to the surface of the phase change reservoir so that it "hangs" from the reservoir (thus maintaining the gap). In such an arrangement, the feature(s) of the reservoir which interact with the feature(s) of the outer housing are typically made from a thermally insulating material in order to further prevent heat transfer. A further benefit of using a rigid shell filled with phase change material is that such a shell is typically refillable.

Nevertheless, a flexible outer membrane filled with phase change material is sometimes appropriate. For example, where minimising the space taken up by the reservoir(s) is more important than structural rigidity. Of course, it is also possible to use a mixture of types of reservoirs (e.g. rigid shells in contact with the top of the inner frame, and flexible membranes in contact with the side(s) of the inner frame).

The skilled person will be able to select an appropriate phase change material. The melting temperature of the phase change material is preferably −30° C. to −6° C., −27° C. to −12° C., −25° C. to −15° C., or even −22° C. to −18° C. Eutectic material is a preferred example of a suitable phase change material. Melting temperatures at the lower ends of these ranges are preferred where longer storage periods are anticipated (e.g. if the frozen confectionery items are to be served on a long-haul flight), whereas for shorter storage periods a melting temperature at the upper end of these ranges may be more appropriate (i.e. to ensure that the frozen confectionery items are served at a temperature where they can be consumed straight away on removal from the thermally insulated container).

As discussed above, the reservoir(s) of phase change material are positioned in thermal contact with the inner frame. The reservoir(s) can be permanently attached to the surface of the inner frame. If this arrangement is used, then it is preferred that the inner frame is removably mounted within the outer housing, since such an arrangement allows the inner frame to be cooled with one or more reservoir(s) of phase change material in situ.

However, in order to allow more flexibility with regard to cooling the reservoir(s) of phase change material, it is preferred that they are removably attached to the inner frame as this means that the reservoir(s) of phase change can be cooled without the need to provide sufficient freezer space to freeze the entire inner frame assembly (i.e. thermally conductive inner frame plus reservoir(s) of phase change material).

The thermally insulated storage container of the present invention permits frozen confectionery items to be stored and served without the need for using dry ice as a coolant. Nevertheless, if it is important to store the confectionery items for a prolonged period prior to serving them (e.g. if the frozen confectionery items are to be served on a long-haul flight), then it is preferred that the container comprises dry ice in addition to the reservoir(s) of phase change material. Where dry ice is used, it is preferably positioned in contact with a reservoir of phase change material, for example on top of the first reservoir of phase change material.

The thermally insulated storage container preferably comprises at least one product drawer for holding a plurality of the frozen confectionery items. The product drawer is preferably engageable within the inner frame such that the drawer can be moved relative to the inner frame in a slidable manner between an open position and a closed position. It is also possible for the storage container to comprise a plurality of product drawers. For example, this allows different types of frozen confectionery products to be segregated into different product drawers to facilitate serving of the correct product.

The product drawer(s) can be made of any suitable material. For example plastic drawers and metal drawers are both possible. Where the product drawer is made of a thermally conductive material (e.g. a metal drawer, such as an aluminium drawer), it preferably comprises an insulated front plate to mitigate the coldness. It preferably, but not necessary for the entire front plate to be insulated—it is sufficient if the portion of the front plate designed to be gripped is insulated.

It is not necessary for the thermally insulated storage container to comprise one or more product drawer(s). For example, the frozen confectionery items can simply be placed within the inner frame without the need for any further container. Equally, the frozen confectionery items can be placed on one or more shelf mounted within the inner frame. The frozen confectionery items can optionally be enclosed within secondary packaging, such as a cardboard or paperboard carton. Where such secondary packaging is present, this can be in addition to a product drawer and/or shelf (i.e. the secondary packaging containing the frozen confectionery items can be placed within the product drawer or on the shelf). Equally, it is envisioned that the secondary packaging containing the frozen confectionery items can simply be placed within the inner frame without the need for a product drawer and/or a shelf.

The thermally insulated storage container of the present invention is relatively compact, and therefore has particular application where storage space is limited. For example, the container can be used with inflight service carts, which have dimensional challenges due to their need to be stowed during take/off and manoeuvred through the narrow aircraft aisles. The arrangement allows frozen confectionery items to be kept remote from a storage freezer for a significant period of time (typically up to 24 hours), and facilitates serving during this storage time. As such, the invention relates to an inflight service cart comprising at least one thermally insulated container according to the first aspect of the invention.

The thermally insulated storage container of the present invention is preferably arranged to be removably mounted within a service cart, preferably an inflight service cart. Inflight service carts have been used for decades on commercial flights. They conventionally take the form of a rigid box, with casters at each corner of the base that can be locked to hold the cart in position. Both full and half size carts are available, which differ in their length: approximately 80 cm for a full size cart and 40 cm for a half size cart. Both full and half size carts are approximately 30 cm wide and around 1 m tall. Doors are typically provided at both the front and back of the cart in the case of full size carts, and just at the front for half size carts. The skilled person would be able to provide an insulated box which could be removably mounted within a conventional inflight service cart. Especially as there are only 3 major configurations of airline service carts available: ACE, ATLAS and KSSU, with each of these configurations being internationally recognised within the airline industry.

In a particularly preferred embodiment, the present invention provides a thermally insulated storage container for frozen confectionery items, the storage container arranged to be removably mounted within a service cart, preferably an inflight service cart, and comprising:

a thermally insulated outer housing, a thermally conductive inner frame mounted within the outer housing such that there is a gap between the thermally insulated outer housing and the thermally conductive inner frame, the gap having a width of 2 to 8 mm, the inner frame having at least an upper wall and a lower wall which are connected by two side walls, thereby delimiting a four-sided thermally conductive perimeter within the outer housing, at least a first and a second reservoir of phase change material, each positioned in thermal contact with the inner frame, at least one product drawer for holding a plurality of the frozen confectionery items, the product drawer being engageable within the inner frame such that the drawer can be moved relative to the inner frame in a slidable manner between an open position and a closed position, wherein the first reservoir of phase change material is positioned in thermal contact with the upper wall of the inner frame and the second reservoir of phase change material is positioned in thermal contact with the lower wall of the inner frame.

The present invention also relates to a method for storing and serving frozen confectionery items using the thermally insulated container of the first aspect of the invention.

The method comprises the step of cooling the reservoir(s) of phase change material to a temperature of less than −6° C. Optionally, the thermally conductive inner frame can also be cooled to a temperature of less than −6° C. For example, the thermally conductive inner frame can be cooled to the appropriate temperature with the reservoir(s) of phase change material in situ. Preferably, each reservoir of phase change material is stored for a period of at least 2 hours in a freezer operating below a temperature of −6° C. Preferably, the freezer operates at a temperature below −12° C., more preferably below −15° C. or even below −18° C. The lower limit of the freezer temperature is not especially important, and will largely depend on the operating parameters of the available freezer(s). Whilst there are commercially available freezers which operate at very low temperatures (e.g. below −70° C., such as at −80° C. or even −86° C.), these are mainly found in laboratories and it is more common for freezers to operate down to a temperature of −30° C. A cold store room operating at an appropriate temperature could be used in place of a freezer.

Next, the thermally conductive inner frame is mounted within the insulated chamber of the thermally insulated outer housing with the cooled reservoir(s) of phase change material in thermal contact with the inner frame. The inner frame is mounted within the insulated chamber such that that there is a gap between the thermally insulated outer housing and the thermally conductive inner frame, the gap having a width of 2 to 8 mm.

A plurality of frozen confectionery items are loaded within the thermally conductive inner frame. Where the thermally conductive inner frame is cooled to a temperature of less than −6° C. alongside the reservoir(s) of phase change material, then the frozen confectionery items can already be loaded into the inner frame during the cooling step. Alternatively, the frozen confectionery items can be loaded once the inner frame (with the reservoir(s) of cooled phase change material in situ) is mounted within the insulated chamber, or whilst the inner frame and cooled reservoir(s) of phase change material are being mounted therein.

The frozen confectionery items are stored within the insulated chamber for a period of up to 24 hours. This time period relates to the storage of the frozen confectionery items remote from a freezer. The frozen confectionery items are served during this storage period by opening the openable side of the thermally insulated outer housing and removing at least one of the frozen confectionery items from the insulated chamber, and then preferably closing the openable side of the thermally insulated outer housing.

Preferably the frozen confectionery items are loaded into the thermally conductive inner frame by placing the frozen confectionery items into a product drawer and engaging the product drawer within the inner frame such that the drawer can be moved relative to the inner frame in a slidable manner between an open position and a closed position. The frozen confectionery items can then be served by opening the openable side of the thermally insulated outer housing, sliding the product drawer to the open position and removing at least one of the frozen confectionery items, and then preferably sliding the product drawer to the closed position and closing the openable side of the thermally insulated outer housing. It will be appreciated that a plurality of product drawers can be used (as already discussed above).

The various features of the present invention referred to in individual sections above apply, as appropriate, to other sections mutatis mutandis. Consequently features specified in one section may be combined with features specified in other sections as appropriate.

As used herein the term "comprising" encompasses the terms "consisting essentially of" and "consisting of". Where the term "comprising" is used, the listed steps or options need not be exhaustive. As used herein, the indefinite article "a" or "an" and its corresponding definite article "the" means at least one, or one or more, unless specified otherwise. Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about".

FIGURES

By way of example, the present invention is illustrated with reference to the following figures, in which.

Figure 1A:
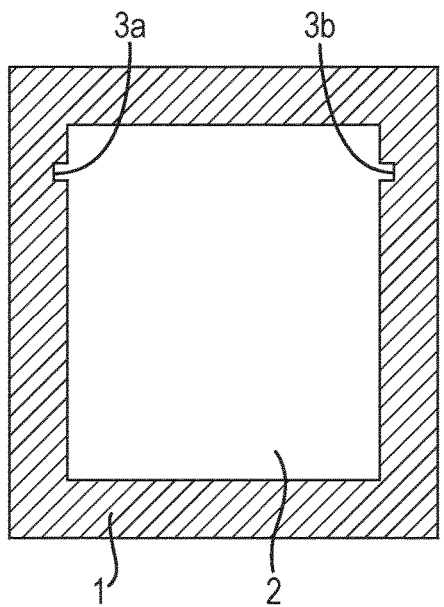
FIGS. 1a and 1b show elements which are assembled to provide the container shown in FIG. 1c; whilst

FIG. 1a is a cross-sectional view of a thermally insulated housing (1) defining an insulated chamber (2). The thermally insulated outer housing (1) is made of EPP, and has a hinged front panel (not shown) to allow access to the insulated chamber (2). The outer housing (1) has two moulded grooves (3a, 3b). It will be appreciated that further groove(s) could additionally be present.

Figure 1B:
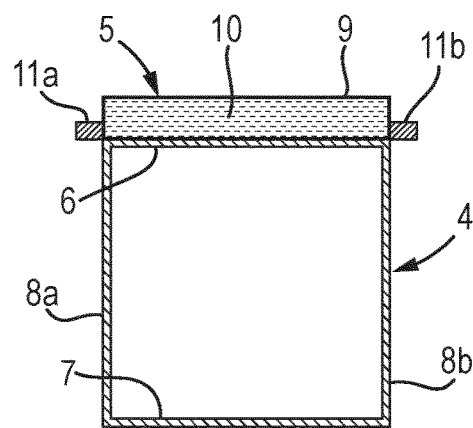

FIG. 1b is a cross-sectional view of an assembly which includes a thermally conductive inner frame (4) and a first reservoir of phase change material (5). The thermally conductive inner frame (4) is made from aluminium and has a thickness of 2 mm. The inner frame (4) has an upper wall (6) and a lower wall (7) which are connected by two side walls (8a, 8b), thereby delineating a four-sided thermally conductive perimeter. The frame additionally has a back plate (not shown), and as such delimits a five-sided conductive boundary. The first reservoir of phase change material (5) consists of a rigid plastic shell (9) filled with phase change material (10), preferably eutectic material. The upper wall (6) of thermally conductive inner frame (4) is attached to the lower wall of the plastic shell (9). This ensures that the first reservoir of phase change material (5) is in thermal contact with the thermally conductive inner frame (4). The rigid shell (9) has two protruding side ribs (11a, 11b). These ribs (11a, 11b) interact with the moulded grooves (3a, 3b) of the outer housing, as can be seen in FIG. 1c.

Figure 1C:
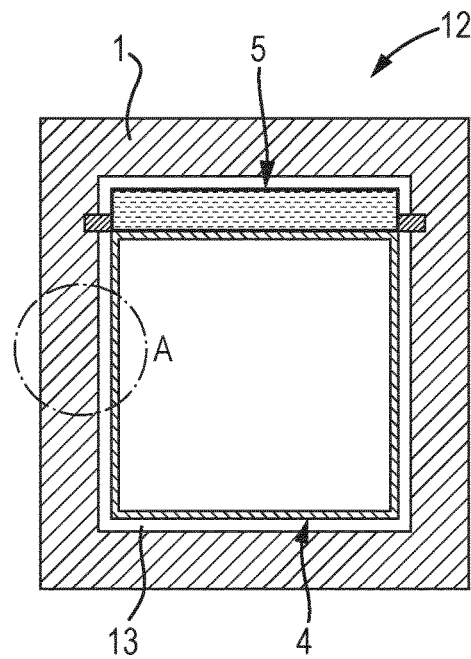
FIG. 1 shows cross-sectional schematic views of a thermally insulated container according to the invention. Specifically.
FIG. 1d shows a more detailed view of part of the container of FIG. 1c.

FIG. 1c is a cross-sectional view of a thermally insulated container (12) according to the invention which has been assembled by mounting the assembly of FIG. 1b within the thermally insulated housing (1) of FIG. 1a. More precisely, the assembly of FIG. 1b has been mounted within the thermally insulated housing (1) of FIG. 1a by engaging the protruding side ribs (11a, 11b) with the moulded grooves (3a, 3b). Since the upper wall (6) of thermally conductive inner frame (4) is attached to the lower wall of the shell (9) of the first reservoir of phase change material (5), the inner frame (4) "hangs" within the thermally insulated chamber (2). This allows the inner frame (4) to be mounted within the insulated chamber (2) such that there is an air gap (13) between the thermally insulated outer housing (1) and the thermally conductive inner frame (4). There is an air gap of 2 to 3 mm around all sides of the frame. The only contact points between the assembly of FIG. 1b and the thermally insulated housing (1) of FIG. 1a are the side ribs (11a, 11b) and the moulded grooves (3a, 3b). In other words, there is also an air gap present between the upper wall of the shell (9) and the outer housing (1). Since the side ribs (11a, 11b) are made from a thermally insulating material, there is little thermal energy transfer between the reservoir of phase change material (5) and the outer housing (1).

Figure 1D:
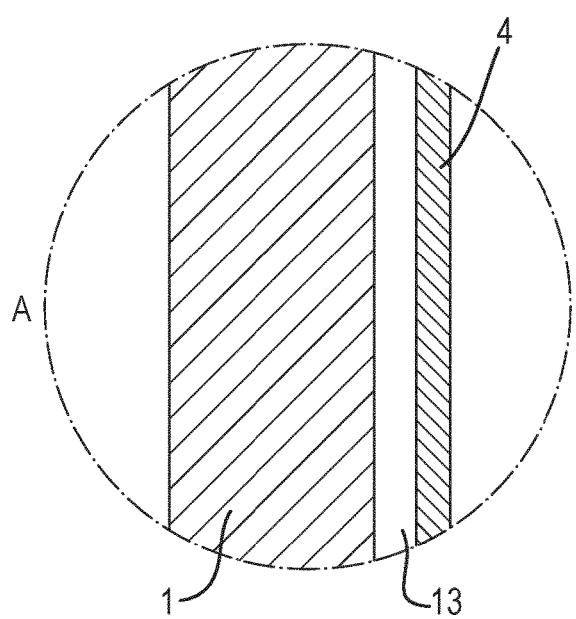

FIG. 1d shows an enlarged view of the area indicated by circle A in FIG. 1c. In particular, FIG. 1d more clearly illustrates the air gap (13) between the inner frame (4) and the outer housing (1).

Figure 2A:
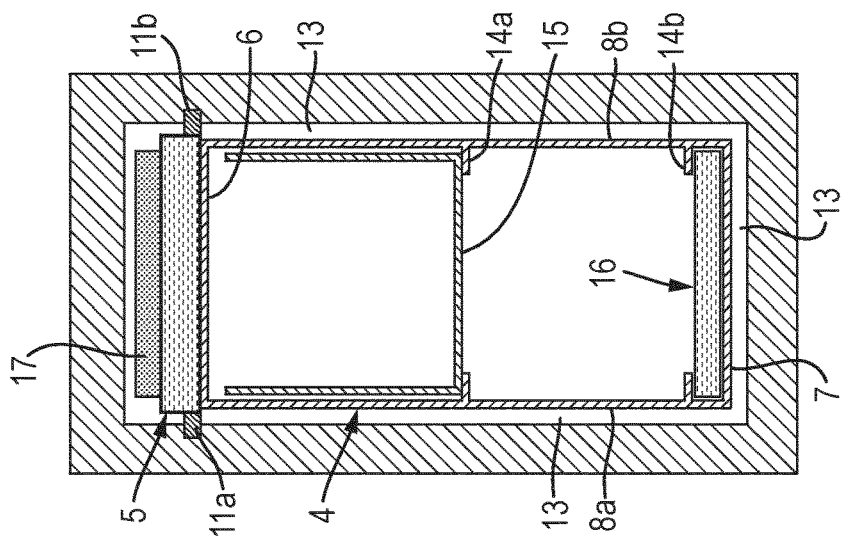
FIGS. 2a, 2b and 2c show cross-sectional views of the three arrangements assessed in Example 2.
Figure 2B:
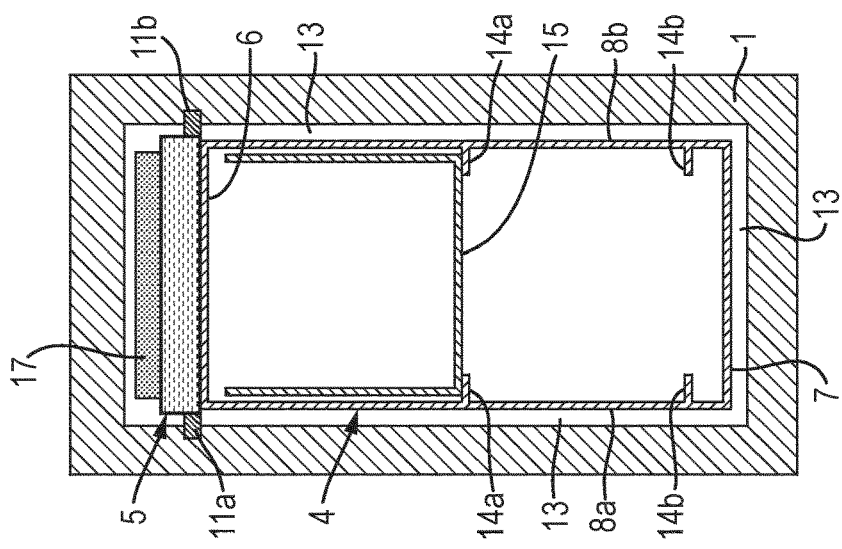
Figure 2C:
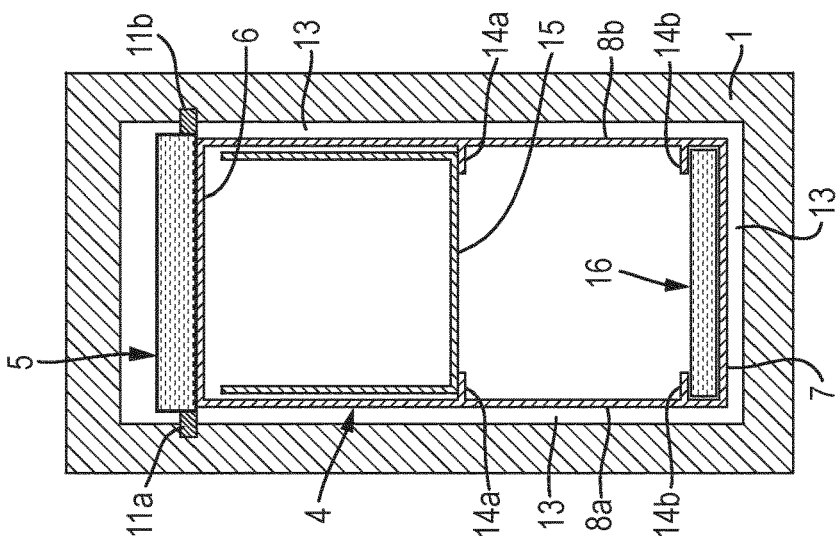

FIGS. 2a, 2b and 2c show cross-sectional views of further thermally insulated containers. In each case, the thermally insulated outer housing (1) is made of EPP, and has a hinged front panel (not shown) to allow access to the insulated chamber (2). The thermally conductive inner frame (4) is made from aluminium and has a thickness of 2 mm. The inner frame (4) has an upper wall (6) and a lower wall (7) which are connected by two side walls (8a, 8b), thereby delineating a four-sided thermally conductive perimeter. In addition, each side wall (8a, 8b) has a projection (14a). These projections (14a) support product drawer (15), thereby enabling the drawer to slide between a closed position (where it is enclosed within the inner frame) and an open position. Of course, the projections (14a) could equally support a shelf (not shown). The product drawer (15) is made of aluminium and can hold a plurality of frozen confectionery items (not shown). Only a single product drawer (15) is shown in each of FIGS. 2a, 2b and 2c. Nevertheless, it will be appreciated that an additional product drawer could be positioned in the lower part of the inner frame, i.e. supported by projections (14b).

The first reservoir of phase change material (5) has the same construction as that described above in relation to FIG. 1, and the inner frame (4) is attached to it in the same manner. Once again, the rigid shell of the first reservoir of phase change material (5) has two protruding side ribs (11a, 11b), which interact with moulded grooves of the outer housing, thus enabling the inner frame to "hang" within the insulated chamber such that there is an air gap (13) between the thermally insulated outer housing (1) and the thermally conductive inner frame (4). There is an air gap of 2 to 3 mm around all sides of the frame.

The thermally insulated containers of FIGS. 2a and 2c both include a second reservoir of phase change material (16), which is positioned in the lower part of the inner frame—specifically so as to contact the lower wall (7) of the inner frame (4). As such, it will be apparent that the second reservoir of phase change material (16) is in thermal contact with the thermally conductive inner frame (4). Should an additional product drawer be provided in either of these containers, it would be positioned in the lower part of the inner frame, i.e. supported by projections (14b). Of course, projections (14b) are not essential, and it will be apparent that these projections could be omitted from the arrangements. For example, if these projections (14b) were omitted from the arrangement of FIG. 2b, then there would be additional space for the product drawer (15) since it would now sit on the lower wall (7) of the inner frame (4).

The thermally insulated containers of FIGS. 2b and 2c both include dry ice (17), which is positioned on top of the first reservoir of phase change material (5).

FIGS. 3a to 3f are cross-sectional views which schematically illustrate further insulated containers according to the invention.

Figure 3A:
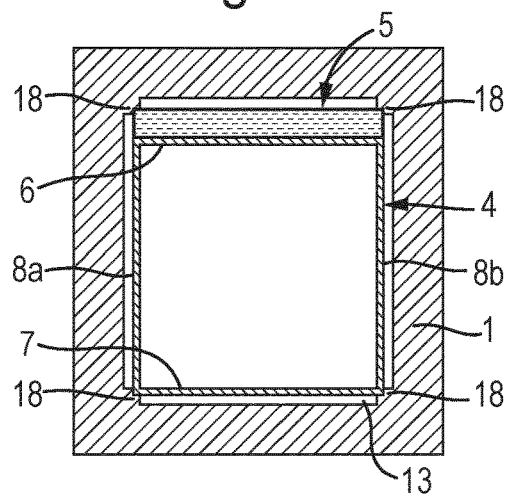
FIGS. 3a to 3f are cross-sectional views which schematically illustrate further insulated containers according to the invention.

FIG. 3a illustrates an alternative way of mounting a thermally conductive frame (4) and a first reservoir of phase change material (5) within a thermally insulated outer housing (1). In this instance, the thermally insulated outer housing (1) has moulded protrusions (18) which hold the frame in place so as to maintain the air gap between the frame and the outer housing. These protrusions (18) are only in contact with the inner frame (4) over a very limited surface area, and since they are made of the same insulating material as the thermally insulated outer housing, there is little thermal energy transfer between the inner frame and the outer housing. The first reservoir of phase change material (5) is positioned on top of the thermally conductive inner frame (4) in contact with the upper wall (6) of the inner frame (4), and is preferably fixed in position so that it doesn't move during use of the insulated container. Although not shown in this figure, it will be appreciated that the first reservoir of phase change material (5) could equally be positioned in contact with the lower wall (6) or one of the sidewalls (8a, 8b) of the inner frame (5).

Figure 3B:
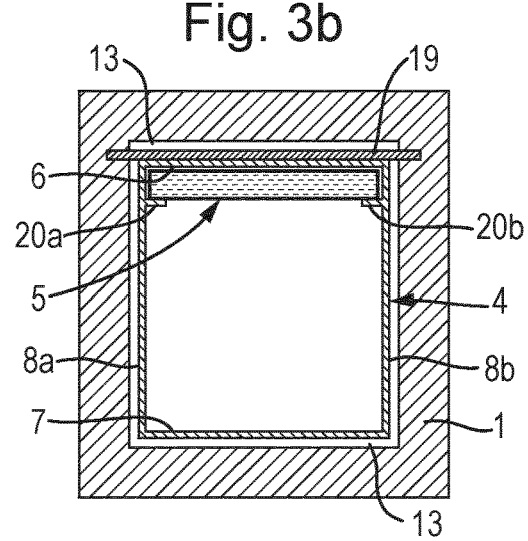

FIG. 3b shows a further way of mounting a thermally conductive frame (4) and a first reservoir of phase change material (5) within a thermally insulated outer housing (1). In this instance, the inner frame is attached to an insulated plate (19) and the insulated plate (19) interacts with moulded grooves of the outer housing (1), thus enabling the inner frame to "hang" within the insulated chamber such that there is an air gap (13) between the thermally insulated outer housing (1) and the thermally conductive inner frame (4). The first reservoir of phase change material (5) is held in position by ridges (20a, 20b) on the sidewalls (8a, 8b) of the inner frame (4).

Figure 3C:
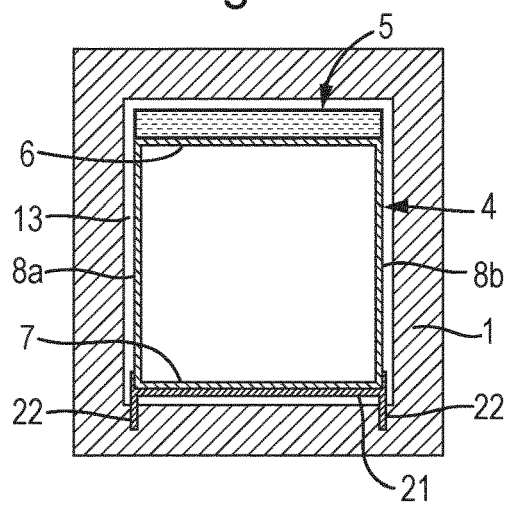

FIG. 3c illustrates yet another possible way of mounting a thermally conductive frame (4) and a first reservoir of phase change material (5) within a thermally insulated outer housing (1). In this instance, the inner frame is supported by an insulated stand (21). The stand (21) has legs (22), which are embedded in the outer housing (1)—these legs (22) are the only contact points between the frame (4) and the outer housing (1). The frame (4) and the stand (21) are in tight contact, such that the frame is held firmly by the stand. This ensures that the frame does not move about and therefore ensures that an air gap (13) between the frame and the outer housing is maintained.

Figure 3D:
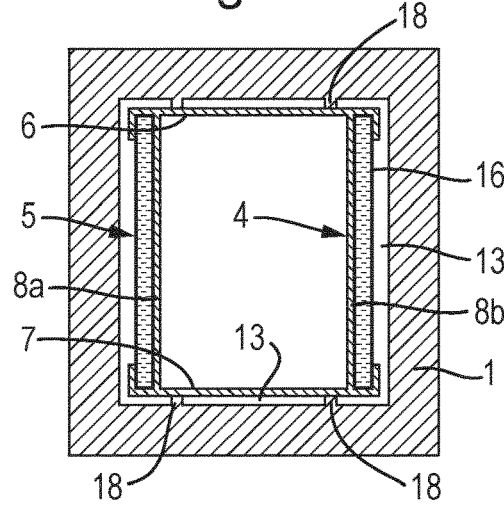

FIG. 3d shows a thermally insulated container wherein the reservoirs of phase change material (5, 16) are in contact with the sidewalls (8a, 8b) of the inner frame (4). The inner frame (4) is between moulded protrusions (18) which hold the frame in place so as to maintain an air gap (13) between the frame and the outer housing (1). The reservoirs of phase change material (5, 16) are shown in contact with the external surface of the frame (4). Although not illustrated, it will be appreciated that alternative arrangements where one or both of the reservoirs of phase change material (5, 16) are in contact with the internal surface of the frame (4) are also possible.

Figure 3E:
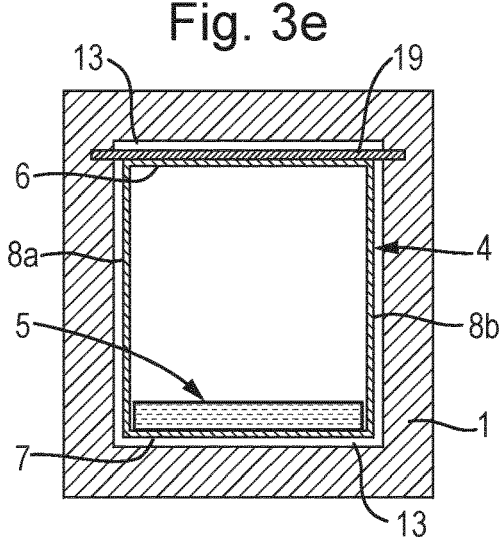

FIG. 3e illustrates a further way of mounting a thermally conductive frame (4) and a first reservoir of phase change material (5) within a thermally insulated outer housing (1). In this instance, the inner frame is attached to an insulated plate (19) and the insulated plate (19) interacts with moulded grooves of the outer housing (1), thus enabling the inner frame to "hang" within the insulated chamber such that there is an air gap (13) between the thermally insulated outer housing (1) and the thermally conductive inner frame (4). The first reservoir of phase change material (5) is positioned in contact with the lower wall (7) of the inner frame.

Figure 3F:
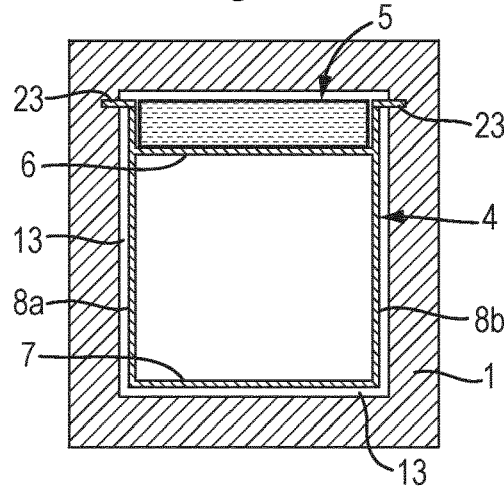

FIG. 3f shows another way of mounting a thermally conductive frame (4) and a first reservoir of phase change material (5) within a thermally insulated outer housing (1). In this instance, the inner frame (4) is shaped so as to have arms (23) which interact with moulded grooves of the outer housing (1), thus enabling the inner frame to "hang" within the insulated chamber such that there is an air gap (13) between the thermally insulated outer housing (1) and the thermally conductive inner frame (4). Although these arms (23) are in contact with the thermally insulated outer housing (1), their small surface area means that transfer of thermal energy between the inner frame (4) and the outer housing (1) is reduced to an acceptable level. The first reservoir of phase change material (5) is positioned on top of the upper wall (6) of the inner frame (4).

Figure 4:
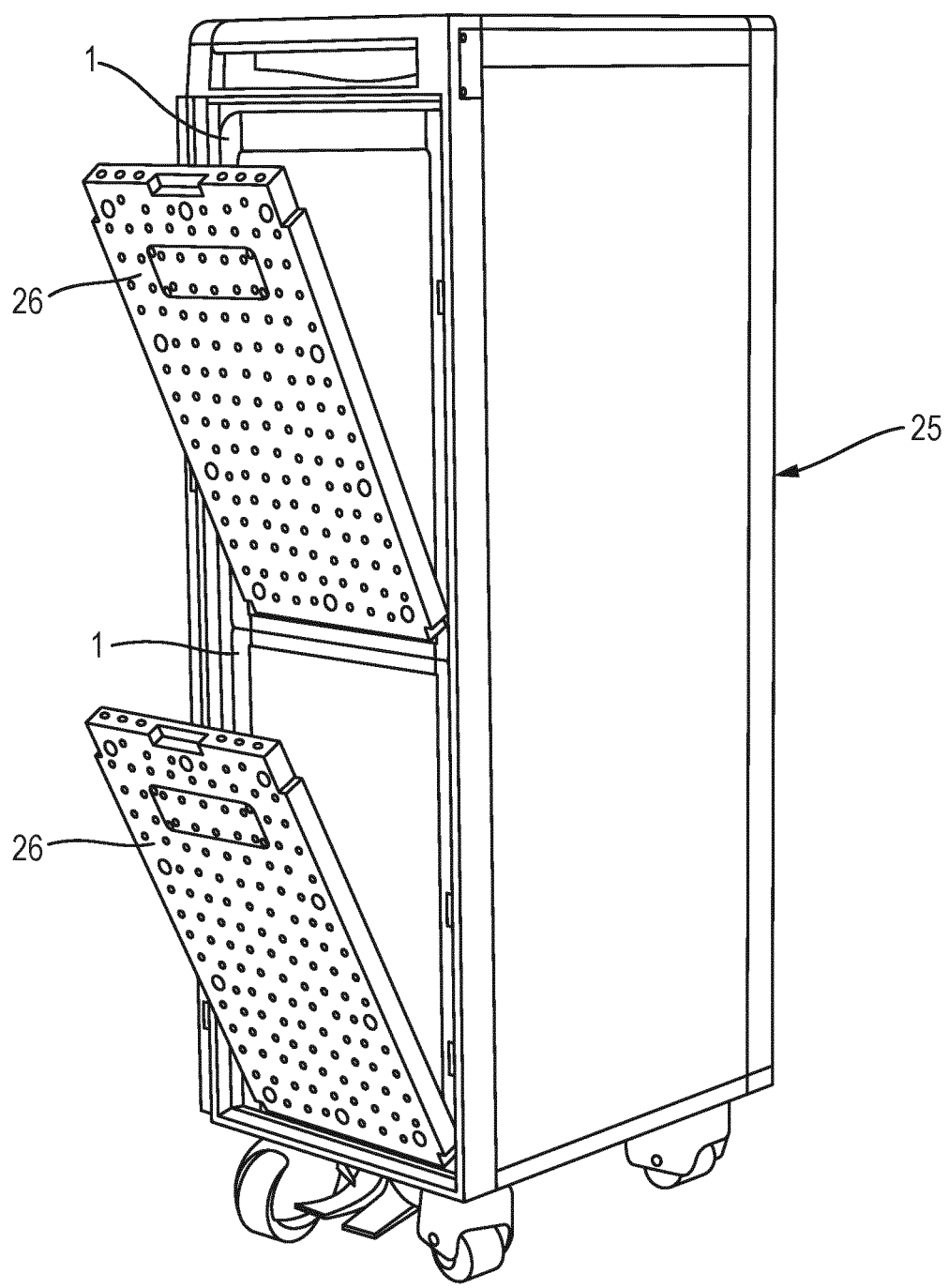
FIG. 4 is a perspective view of a service cart containing two insulated containers.

FIG. 4 is a perspective view of a service cart (25) with two insulated outer housings (1) mounted therein (one above the other). In this view the reservoirs of phase change material and the inner frame are not in situ. Each outer housing (1) comprises a hinged door component (26) which is openable to allow access to the insulated chamber (2).

The invention is not limited to the embodiments illustrated in the figures. Accordingly it should be understood that where features mentioned in the claims are followed by reference numerals, such numerals are included solely for the purpose of enhancing the intelligibility of the claims and are in no way limiting to the scope of the claims.

EXAMPLES

The following examples are intended to illustrate the invention and is not intended to limit the invention to those examples per se.

Example 1

The properties of two thermally insulated container arrangements were investigated. In each case, the thermally insulated outer housing was an insulated EPP box with a hinged front panel to allow access to the insulated chamber (ATLAS 1/3 cooling chest from Icebridge Cooling Solutions). The reservoir of phase change material was provided by filling a plastic cooling cassette (Icebridge Cooling Solutions) with 1.3 kg eutectic material (E-19 from PCM Products Ltd; phase change temperature −18.7° C.). These cassettes are designed to be received by the insulated boxes and have protruding ribs extending along each side which are received by corresponding grooves moulded into the internal walls of the insulated outer housing. Before being used in the arrangements of this example, each reservoir of phase change material was cooled so that all of the phase change material was solid (i.e. >24 hours in a freezer operating at −32° C.).

Arrangement 1 is illustrated in FIG. 1 and has an air gap of 2 to 3 mm around all sides of the frame. Control arrangement A differs from arrangement 1 in that there is no air gap. This is achieved by using a slightly larger aluminium frame in combination with conductive paste to ensure that the aluminium frame is in thermal contact with insulated box. Both arrangements additionally included an aluminium front plate (meaning that the inner frame delimited a six-sided conductive boundary within the outer housing).

The arrangements were tested side by side at room temperature (20° C.). Each one was loaded with 30 frozen confectionery items (Magnum classic minis, 50 g), and then sealed and monitored for 12 hours with temperature measurements being taken throughout the monitoring period.

Figure 5:
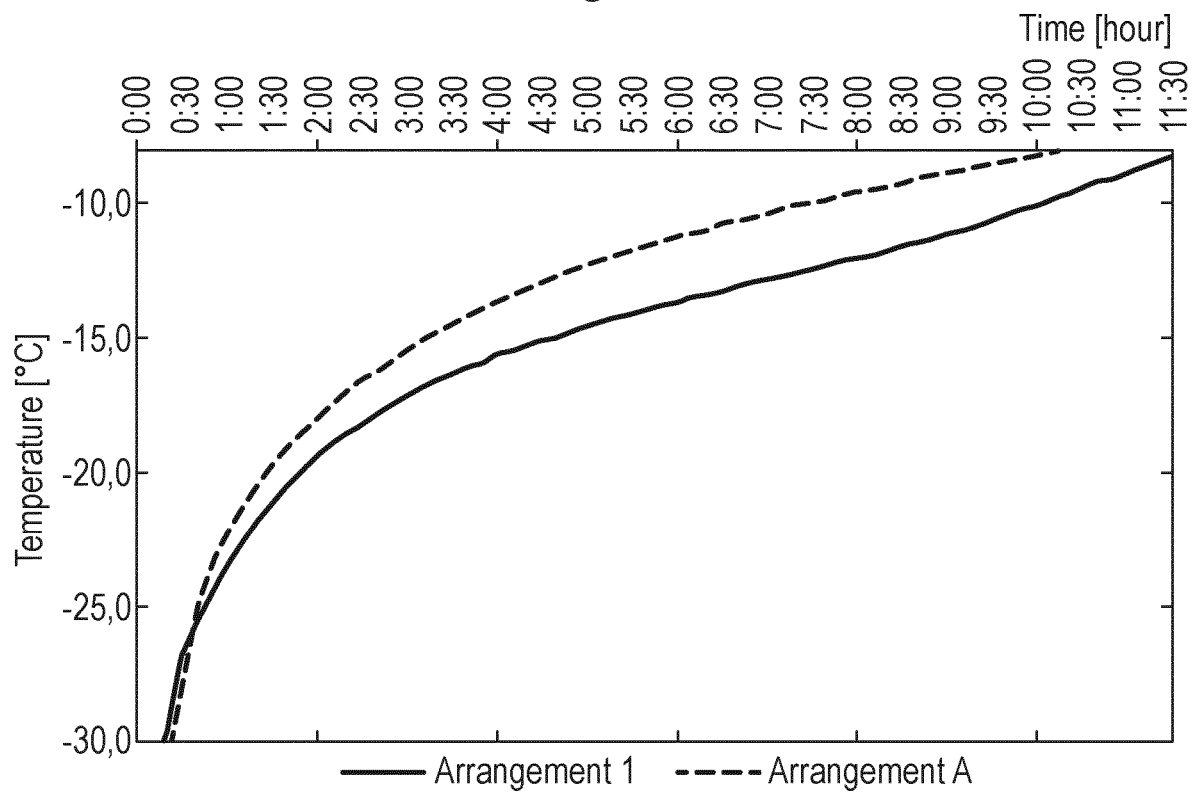
FIG. 5 shows average temperature curves for the two arrangements described in Example 1.

The average temperature measurements of the two arrangements are shown in FIG. 5. The data shows a clear benefit of having an air gap. In particular, arrangement 1 took 30 minutes longer to reach −18° C. than arrangement A, 1 hour 20 minutes longer to reach −15° C., 2 hours 40 minutes longer to reach −12° C., and 2 hours 30 minutes to reach −10° C.

Example 2

The properties of three thermally insulated container arrangements were investigated. In each case, the thermally insulated outer housing was an insulated EPP box with a hinged front panel to allow access to the insulated chamber (ATLAS 1/2 cooling chest from Icebridge Cooling Solutions). The first reservoir of phase change material was provided by filling a plastic cooling cassette (Icebridge Cooling Solutions) with 1.3 kg eutectic material (E-19 from PCM Products Ltd; phase change temperature −18.7° C.). These cassettes are designed to be received by the insulated boxes and have protruding ribs extending along each side which are received by corresponding grooves moulded into the internal walls of the insulated outer housing. In each arrangement, the frame is a four-sided aluminium frame mounted such that there is an air gap of 2 to 3 mm around all sides of the frame and there is an aluminium product drawer in the upper portion of the frame (i.e. supported by projections from the sidewalls).

Arrangement 2 is illustrated in FIG. 2a and includes a second reservoir of phase change material (containing 1.3 kg of E-19 from PCM Products Ltd; phase change temperature −18.7° C.). The second reservoir of phase change material is placed inside the frame and is in contact with lower wall of the frame.

Arrangement 3 is illustrated in FIG. 2b and includes dry ice (0.6 kg) which is placed on top of the first reservoir of phase change material. The dry ice does not touch the insulated outer housing.

Arrangement 4 is illustrated in FIG. 2c and includes both dry ice (0.6 kg) and a second reservoir of phase change material (containing 1.3 kg of E-19 from PCM Products Ltd; phase change temperature −18.7° C.). The dry ice is placed on top of the first reservoir of phase change material and does not touch the insulated outer housing. The second reservoir of phase change material is placed inside the frame and is in contact with lower wall of the frame.

Before being used in the arrangements of this example, each reservoir of phase change material was cooled so that all of the phase change material was solid (i.e. >24 hours in a freezer operating at −32° C.).

The arrangements were tested side by side at room temperature (20° C.). Each one was loaded with 60 frozen confectionery items (Magnum classic minis, 50 g)—30 of which were placed in the product drawer and 30 of which were placed in the lower portion of the frame. The arrangements were sealed and monitored for 21 hours with temperature measurements being taken throughout the monitoring period.

Figure 6:
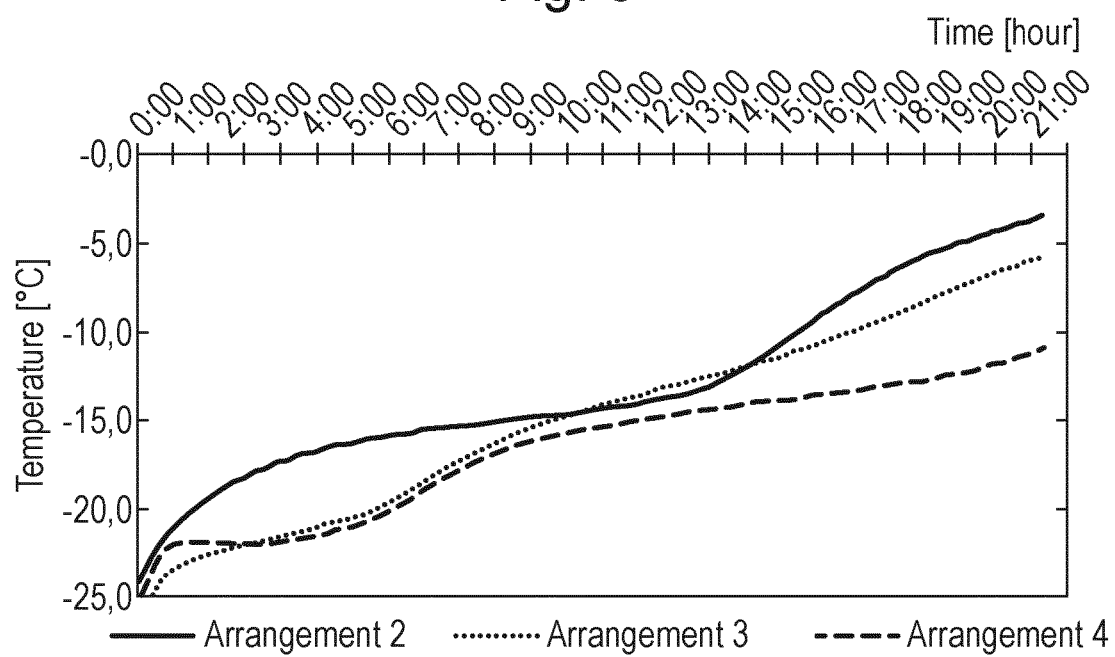
FIG. 6 shows average temperature curves for the three arrangements described in Example 2.

The average temperature measurements of the three arrangements are shown in FIG. 6. It can be seen that arrangement 2 (with a first and second reservoir of phase change material) has a stable temperature profile between 4 and 13 hours. This represents a window in which the frozen confectionery items can be served and be at a suitable temperature for immediate consumption. The temperature profile of arrangement 3 (with a first reservoir of phase change material and dry ice) indicates that it is possible to increase the initial storage period (i.e. at a temperature below −18° C.) to around 5 hours. After this period, the frozen confectionery items will be at a temperature where they can be served for immediate consumption. However, once this temperature is reached, the window during which the frozen confectionery products can be served is narrower than it is for arrangement 2. Finally, it can be seen that arrangement 4 (with a first and second reservoir of phase change material and dry ice) has both the increased initial storage period (i.e. at a temperature below −18° C.) of around 5 hours, and a stable temperature profile between around 7 and 16 hours. This represents a window in which the frozen confectionery items can be served and be at a suitable temperature for immediate consumption.

In conclusion, the use of two reservoirs of phase change material increases the length of the window in which the frozen confectionery products can be served and be at a suitable temperature for immediate consumption. The use of dry ice increases the initial storage period (i.e. the period in which the frozen confectionery items are too cold to be suitable for immediate consumption). This may be useful, since there will inevitably be a period during which the frozen confectionery items are stored whilst being transported to the plane, and in any case, service of such items will not begin until the aircraft is airborne.

The invention claimed is:

1. Thermally insulated container (12) for storing and serving frozen confectionery items, the container comprising:
a thermally insulated outer housing (1) defining an insulated chamber (2), the thermally insulated outer housing (1) having at least one openable side (26) to allow access to the chamber (2),
a thermally conductive inner frame (4) mounted within the insulated chamber (2), the inner frame (4) having at least an upper wall (6) and a lower wall (7) which are connected by two side walls (8a, 8b), thereby delineating a four-sided thermally conductive perimeter within the outer housing,
at least a first reservoir of phase change material (5), positioned in thermal contact with the inner frame (4),
wherein the inner frame (4) is mounted within the insulated chamber (2) such that there is a gap (13) between the thermally insulated outer housing (1) and the thermally conductive inner frame (4), the gap (13) having a width of 2 to 8 mm.

2. Thermally insulated container (12) as claimed in claim 1 and additionally comprising a second reservoir of phase change material (16), wherein the second reservoir of phase change material (16) is positioned in thermal contact with the inner frame (4).

3. Thermally insulated container (12) as claimed in claim 2 wherein the first reservoir of phase change material (5) is positioned in thermal contact with the upper wall (6) of the inner frame (4) and the second reservoir of phase change material (16) is positioned in thermal contact with the lower wall (7) of the inner frame (4).

4. Thermally insulated container (12) as claimed in claim 1 wherein the gap (13) has a width of 3 to 5 mm.

5. Thermally insulated container (12) as claimed in claim 1 wherein the inner frame (4) additionally comprises a thermally conductive back plate.

6. Thermally insulated container (12) as claimed in claim 1 wherein the thermally conductive inner frame (4) is removably mounted within the insulated chamber (2).

7. Thermally insulated container (12) as claimed in claim 1 wherein the container additionally comprises dry ice (17) positioned in contact with the reservoir of phase change material (5, 16).

8. Thermally insulated container (12) as claimed in claim 1 wherein the container additionally comprises at least one product drawer (15) for holding a plurality of frozen confectionery items, the product drawer (15) being engageable within the inner frame (4) such that the drawer (15) can be moved relative to the inner frame (4) in a slidable manner between an open position and a closed position.

9. Thermally insulated container (12) as claimed in claim 8 wherein the product drawer (15) is a plastic drawer.

10. Thermally insulated container (12) as claimed in claim 8 wherein the product drawer (15) is a metal drawer.

11. Thermally insulated container (12) as claimed in claim 1 wherein the thermally conductive inner frame (4) is made from aluminium or an aluminium alloy.

12. Thermally insulated container (12) as claimed in claim 1 wherein the thermally insulated outer housing (1) comprises a material selected from: expanded polypropylene (EPP), polyurethane (PU), Aerogel, and vacuum panels.

13. A service cart (25) comprising at least one insulated container (12) as claimed in claim 1.

14. The thermally insulated container according to claim 1 wherein the inner frame (4) hangs within the thermally insulated chamber (2).

15. The thermally insulated container according to claim 14 wherein the thermally conductive inner frame is attached to the surface of the phase change reservoir so that it hangs from the reservoir.

16. The thermally insulated container according to claim 1 wherein the reservoir of phase change material (5) is held in position by ridges (20a, 20b) on the sidewalls (8a, 8b) of the inner frame (4).

17. The thermally insulated container according to claim 1 wherein the reservoirs of phase change material (5,16) are in contact with sidewalls (8a, 8b) of the inner frame (4) and the inner frame (4) is between moulded protrusions (18) which hold the frame in place so as to maintain the gap (13) between the frame and the outer housing (1).

18. The thermally insulated container according to claim 1 wherein the inner frame (4) is shaped so as to have arms (23) which interact with moulded grooves of the outer housing (1), thus enabling the inner frame to hang within the insulated chamber such that there is the gap (13) between the thermally insulated outer housing (1) and the thermally conductive inner frame (4), and the reservoir of phase change material (5) is positioned on top of the upper wall (6) of the inner frame (4).

19. A method for storing and serving frozen confectionery items using a thermally insulated container (12) as claimed in claim 1, the method comprising:
    cooling the reservoir(s) of phase change material (5, 16) to a temperature of less than −6° C.;
    mounting the thermally conductive inner frame (4) within the insulated chamber (2) of the thermally insulated outer housing (1) such that the cooled reservoir(s) of phase change material (5, 16) are in thermal contact with the inner frame (4) and a plurality of frozen confectionery items are loaded within the inner frame (4); wherein the inner frame (4) is mounted within the insulated chamber (2) such that that there is a gap (13) between the thermally insulated outer housing (1) and the thermally conductive inner frame (4), the gap (13) having a width of 2 to 8 mm;
    storing the frozen confectionery items within the insulated chamber (2) for a period of up to 24 hours and serving the frozen confectionery items during the storage period by opening an openable side (26) of the thermally insulated outer housing and removing at least one of the frozen confectionery items from the insulated chamber (2).

20. Method for storing and serving frozen confectionery items as claimed in claim 19 wherein:
    the frozen confectionery items are loaded into the thermally conductive inner frame (4) by placing the frozen confectionery items into a product drawer (15) and engaging the product drawer (15) within the inner frame (4) such that the drawer (15) can be moved relative to the inner frame (4) in a slidable manner between an open position and a closed position; and
    the frozen confectionery items are served by opening the openable side (26) of the thermally insulated outer housing, sliding the product drawer (15) to the open position and removing at least one of the frozen confectionery items, and then sliding the product drawer (15) to the closed position and closing the openable side (26) of the thermally insulated outer housing.

* * * * *